UNITED STATES PATENT OFFICE.

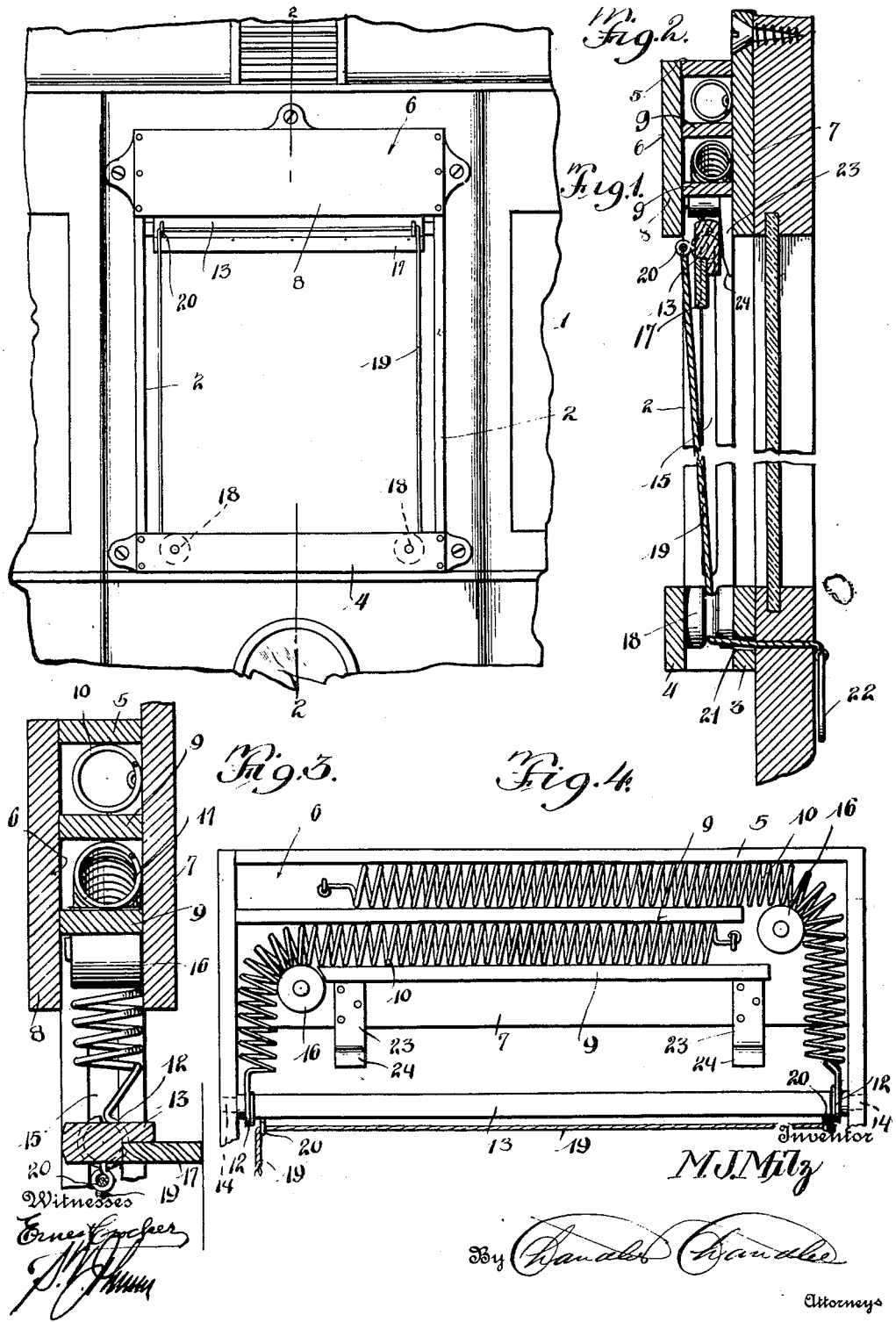

MAX J. MILZ, OF TAFT, CALIFORNIA.

WINDOW-CLEANER.

1,087,600.   Specification of Letters Patent.   Patented Feb. 17, 1914.

Application filed June 11, 1913. Serial No. 773,047.

*To all whom it may concern:*

Be it known that I, MAX J. MILZ, a citizen of Austria-Hungary, residing at Taft, in the county of Kern, State of California, have invented certain new and useful Improvements in Window-Cleaners; and I do hereby declare the following to be a full, clear, and exact description of the invention, such as will enable others skilled in the art to which it appertains to make and use the same.

The present invention is directed to improvements in window cleaners, and has for its object to provide a device of this character especially adapted for application to the motorman's window of a street car.

A further object of the invention is to provide a device of this character so constructed that it can be easily and quickly applied to the motorman's window so that the same can be thoroughly cleaned of snow, sleet or moisture.

A still further object of the invention is to so construct a device of this character so that the same can be operated by the motorman without leaving the platform.

With these and other objects in view, this invention resides in the novel features of construction, formation, combination and arrangement of parts to be hereinafter more fully described, claimed and illustrated in the accompanying drawing, in which:—

Figure 1 is a front elevation of the device. Fig. 2 is a sectional view on line 2—2 of Fig. 1. Fig. 3 is a similar view showing the same in its operative position. Fig. 4 is a front elevation of the upper portion of the device, with the cover removed.

Referring to the drawing, the numeral 1 designates a frame which consists of side rails 2, inner and outer lower rails 3 and 4, and between which the lower ends of the side rails 2 are secured.

The top rail 5 has its opposite ends connected to the upper ends of the side rails 2, said top rails forming the cover for the casing 6. The casing 6 is formed by the back strip 7, and cover 8, thus providing a casing having an open lower end.

Mounted in the casing 6 are spaced horizontal strips 9, which serve to prevent the coil springs 10 and 11 from contacting, said springs having their inner ends connected to the back strip 7 and their outer ends provided with eyes 12 which are engaged by the ends of the bar 13, said bar having its opposite ends provided with extensions 14 which are adapted for travel in the vertical slots 15 formed in the side rails 2. To permit the springs to expand and contract in a free manner are rollers 16.

The strips 9 not only serve to prevent the springs from coming in contact with each other, but prevent the same tangling when the device is in its inoperative position.

To the lower edge of the bar 13 is secured a strip of felt or suitable material 17 which is designed to come in contact with the outer surface of the window pane so that when the bar is moved downwardly the snow, sleet or moisture will be removed therefrom.

Supported between the rails 3 and 4, near the outer ends thereof are grooved rollers 18 which are engaged by the cord 19, said cord being also passed through eyes 20 carried by the opposite ends of the bar 13, and as said eyes are arranged upon the outer surface of the bar pulling upon the cord will cause the bar to rock so that the strip 17 carried thereby will engage the window pane so that during the downward travel of the bar the pane will be thoroughly cleaned. It will be obvious that as long as there is strain upon the cord the bar will be held in its rocked position so that as the same moves upwardly it will also be in position to compel the strip 17 to engage the window pane.

The lower ends of the cord 19 are passed through an opening 21 which is formed in the rail 4 and are connected to a ring 22, said ring being located in convenient reach of the motorman so that when it is desired to clean the window pane it is only necessary to pull the ring inwardly whereupon the cord will rock the bar 13 from a vertical position to a horizontal position, the continued downward movement of the bar causing the springs 10 and 11 to expand as the bar moves downwardly, said springs serving, during their contraction to return the bar to its normal position.

Secured to the back 7 are depending blocks 23 which have their lower ends beveled, as at 24, said blocks serving to rock the bar 13 from a horizontal position to a vertical position so that the same can enter the lower end of the casing 6, after the bar has completed its upward travel.

The device can be applied to the usual frame of the storm front of a street car in any suitable manner.

What is claimed is:—

A device for cleaning windows comprising a frame having vertical slots formed in its side rails, a casing mounted in the upper end of the frame, springs having one of their ends connected in the casing and their other ends provided with eyes, a rocking bar having its opposite ends engaged in said eyes and provided with extensions for engaging the slots, a cleaning strip carried by the rocking bar, a cord engaging the rocking bar for moving the same from a vertical to a horizontal position so that the strip carried thereby will engage a window pane as the bar moves downwardly during the expansion of the springs, and means for returning the bar from a horizontal to a vertical position when the same is moving upwardly and the springs are contracting.

In testimony whereof, I affix my signature, in the presence of two witnesses.

MAX J. MILZ.

Witnesses:
J. H. BATTEN,
PAUL R. T. HEATH.